United States Patent
Yamase

(10) Patent No.: US 9,121,453 B2
(45) Date of Patent: Sep. 1, 2015

(54) DOUBLE-OFFSET CONSTANT VELOCITY UNIVERSAL JOINT

(75) Inventor: Tohru Yamase, Iwata (JP)

(73) Assignee: NTN CORPORATION, Osaka (JP)

( * ) Notice: Subject to any disclaimer, the term of this patent is extended or adjusted under 35 U.S.C. 154(b) by 1366 days.

(21) Appl. No.: 12/595,844

(22) PCT Filed: Apr. 7, 2008

(86) PCT No.: PCT/JP2008/056856
§ 371 (c)(1),
(2), (4) Date: Oct. 14, 2009

(87) PCT Pub. No.: WO2008/139792
PCT Pub. Date: Nov. 20, 2008

(65) Prior Publication Data
US 2010/0130290 A1     May 27, 2010

(30) Foreign Application Priority Data
May 7, 2007  (JP) .................................. 2007-122661

(51) Int. Cl.
*F16D 3/227* (2006.01)
*F16D 3/223* (2011.01)

(52) U.S. Cl.
CPC ...... *F16D 3/227* (2013.01); *F16D 2003/22303* (2013.01); *F16D 2250/00* (2013.01); *F16D 2300/10* (2013.01)

(58) Field of Classification Search
USPC ..................... 464/140, 146, 906; 29/898.067; 384/523, 527
See application file for complete search history.

(56) References Cited

U.S. PATENT DOCUMENTS

| | | | |
|---|---|---|---|
| 2,983,118 A * | 5/1961 | Wicoff | 464/140 |
| 6,299,544 B1 * | 10/2001 | Schwarzler et al. | 464/146 |
| 2002/0077186 A1 | 6/2002 | Hosoya et al. | |
| 2007/0060399 A1 | 3/2007 | Feichter | |
| 2009/0064811 A1 * | 3/2009 | Shirai | 29/898.067 X |

FOREIGN PATENT DOCUMENTS

| JP | 2002-188653 | 7/2002 |
|---|---|---|
| JP | 2004-276136 | 10/2004 |

(Continued)

OTHER PUBLICATIONS

International Preliminary Report on Patentability and Written Opinion of the International Searching Authority dated Dec. 3, 2009 issued in International (PCT) Application No. PCT/JP2008/056856.

(Continued)

*Primary Examiner* — G. Binda
(74) *Attorney, Agent, or Firm* — Wenderoth, Lind & Ponack, L.L.P.

(57) ABSTRACT

The outer peripheral surface (32) and the inner spherical peripheral surface (34) of a cage (30) of a double-offset constant velocity universal joint are cut after being quenched. More specifically, to finish the outer peripheral surface (32) of the cage (30) made up of a spherical portion (32a) and tapered portions (32b, 32c), the spherical portion (32a) and the tapered portions (32b, 32c) are cut after being quenched. Then, the spherical portion (32a) is cut at a cutting speed lower than that for the tapered portions (32b, 32c), thereby providing a better roughness to the cut surface of the spherical portion (32a) than to the cut surface of the tapered portions (32b, 32c).

3 Claims, 3 Drawing Sheets

(56) References Cited

FOREIGN PATENT DOCUMENTS

| | | |
|---|---|---|
| JP | 2005-349928 | 12/2005 |
| JP | 2007-71394 | 3/2007 |
| WO | WO 2007/046321 A1 * | 4/2007 |

OTHER PUBLICATIONS

International Search Report dated May 1, 2008 for International Application No. PCT/JP2008/056856.

* cited by examiner

DOUBLE-OFFSET CONSTANT VELOCITY UNIVERSAL JOINT

TECHNICAL FIELD

The present invention relates to a double-offset constant velocity universal joint.

BACKGROUND ART

Among those constant velocity universal joints that are used for automobiles or various types of industrial machines, for example, the plunging constant velocity universal joint, which is designed to permit angular and axial displacement, is employed for the drive shafts of front wheel drive cars or rear wheel drive cars of the independent suspension scheme. One type of plunging constant velocity universal joint is a double-offset constant velocity universal joint. The double-offset constant velocity universal joint mainly includes: an outer race serving as an outer joint member; an inner race serving as an inner joint member; a plurality of balls interposed between the outer race and the inner race to serve as a torque transmitting element for transmission of torque; and a cage for holding all the balls in a plane. The cage has an outer spherical surface in contact with the inner cylindrical peripheral surface of the outer race and an inner spherical surface in contact with the outer spherical peripheral surface of the inner race, in which the center of the outer spherical surface and the center of the inner spherical surface are offset oppositely from each other with respect to the joint center. This is because the joint is of the double offset type. Because the balls are held in one and the same plane by the cage, even at an operation angle, the axial position of the center of the balls is located on a bisecting plane of the outer spherical surface center and the inner spherical surface center of the cage, thereby maintaining the constant velocity property.

[Patent Document 1] Japanese Patent Application Laid-Open No. 2007-71394

DISCLOSURE OF THE INVENTION

Problems That the Invention is to Solve

Recently, since quenched steel cutting for cutting after quenching is environmentally friendly clean processing, some constant velocity universal joint parts have been processed not by grinding but now by quenched steel cutting. For example, Patent Document 1 teaches that the spherical portion of the outer peripheral surface of the cage of the double-offset constant velocity universal joint is subjected to hard processing and the other remaining portion to soft processing. However, in Patent Document 1, the portion other than the spherical portion undergoes soft processing and is then hardened by heat treatment, and after that the spherical portion is subjected to hard processing. It is thus likely that there will be variations in thickness of the portions other than the spherical portion, thereby making it difficult to ensure the conventionally available strength or operation angle. That is, the tapered portion reduced in thickness cannot ensure enough strength, whereas the tapered portion increased in thickness cannot ensure adequate operation angles.

Furthermore, the entire outer peripheral surface of the cage may be processed by quenched steel cutting at the same speed. In this case, since the outer peripheral surface is made up of the spherical portion and the tapered portion, it is required to be cut over a long distance and thus takes a long time for the cutting. Accordingly, this step was a bottleneck from the viewpoint of shortening cycle time.

An object of the present invention is to shorten the cycle time for finish machining of a double-offset constant velocity universal joint as well as to satisfy the accuracy required to ensure the functions such as its strength and operation angle.

Means of Solving the Problems

A double-offset constant velocity universal joint of the present invention includes: an inner race having an outer spherical peripheral surface and ball grooves formed to extend axially at equal intervals in a circumferential direction of the outer peripheral surface; an outer race having an inner cylindrical peripheral surface and ball grooves formed to extend axially at equal intervals in a circumferential direction of the inner peripheral surface; a ball interposed between a pair of the ball groove of the inner race and the ball groove of the outer race; and a cage interposed between the outer peripheral surface of the inner race and the inner peripheral surface of the outer race and having pockets for accommodation of the balls. The outer peripheral surface of the cage includes a spherical portion and tapered portions located on respective sides in an axial direction of the spherical portion, and contacts at the spherical portion with the inner cylindrical peripheral surface of the outer race. The inner peripheral surface of the cage has a spherical portion in contact with the outer spherical peripheral surface of the inner race. The inner peripheral surface having the spherical portion of the cage, that is, the inner spherical peripheral surface may refer to an inner peripheral surface having a single radius of curvature or an inner peripheral surface having a cylindrical surface at the top of the inner peripheral surface.

The spherical portion of the outer peripheral surface of the cage of the double-offset constant velocity universal joint configured as described above serves for the cage to undergo an angular displacement smoothly within the inner cylindrical peripheral surface of the outer race when the joint is at an angle. The tapered portions serve to restrict the joint angle so that the joint is not at an unnecessarily excessive angle.

The outer peripheral surface of the cage and the inner spherical peripheral surface of the cage are cut after being quenched. It is thus possible to shorten the cycle time by employing the quenched steel cutting. For example, take a cage of a double-offset constant velocity universal joint with an outer peripheral surface which has a spherical portion and tapered portions located at respective sides in the axial direction of the spherical portion. To finish the outer peripheral surface of the cage, the spherical portion may be cut at a lower speed than the tapered portions are cut, thereby providing a better roughness to the cut surface of the spherical portion than to the tapered portions. The entire outer peripheral surface of the cage, i.e., both the spherical portion and tapered portions, may be subjected to quenched steel cutting, thereby being formed in the same shape as in the case of grinding. In this case, the spherical portion is cut at a speed that provides the same surface roughness as that provided by grinding, while the tapered portions are cut at as high a speed as possible since it is intended only for angle restriction. In this manner, the total cutting time is shortened, thereby eliminating the bottleneck step.

Effects of the Invention

According to the present invention, the cutting feed speed for quenched steel cutting of the spherical portion and the tapered portions of the outer peripheral surface of the cage can be varied, thereby improving the surface roughness of the spherical portion which has great effects on the durability and NVH (Noise, Vibration, and Harshness) properties. It is thus possible to contribute to improvement in durability and NVH properties.

At the same time, post-treatment of coolant effluent and chips caused by conventional grinding is no longer required, eliminating concerns about the effects they have on the environment.

Furthermore, the outer peripheral surface and the inner spherical peripheral surface of the cage can be cut after being quenched, thereby minimizing variations in positional accuracy (offset error) of the spherical portion center of the outer peripheral surface and the spherical portion center of the inner spherical peripheral surface and variations in thickness of the cage (unevenness in thickness due to eccentricity). This makes it possible to ensure stable strength and operation angles.

Figure 1:
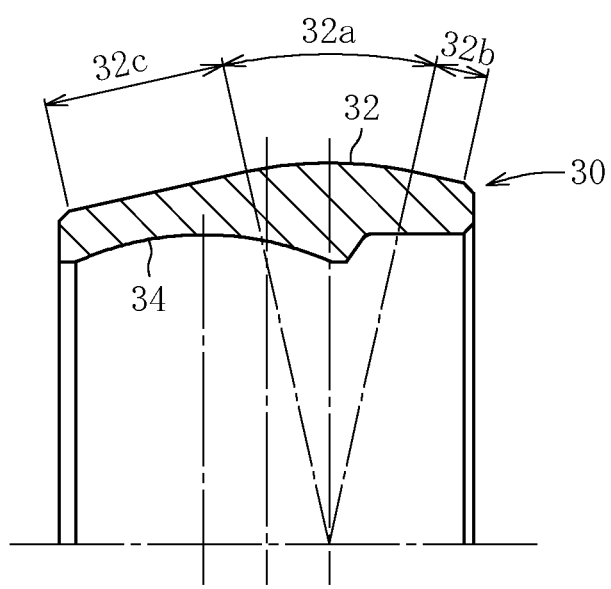
FIG. 1 is a longitudinal sectional view illustrating a cage according to an embodiment of the present invention.

DESCRIPTION OF REFERENCE NUMERALS 10 outer race
12 inner peripheral surface
14 ball groove
16 flange
20 inner race
22 outer spherical surface
24 ball groove
26 serrated hole
30 cage
32 outer peripheral surface
32a spherical portion
32b tapered portion
32c tapered portion
34 inner spherical peripheral surface
36 pocket
40 ball

DETAILED DESCRIPTION OF THE INVENTION

Figure 2:
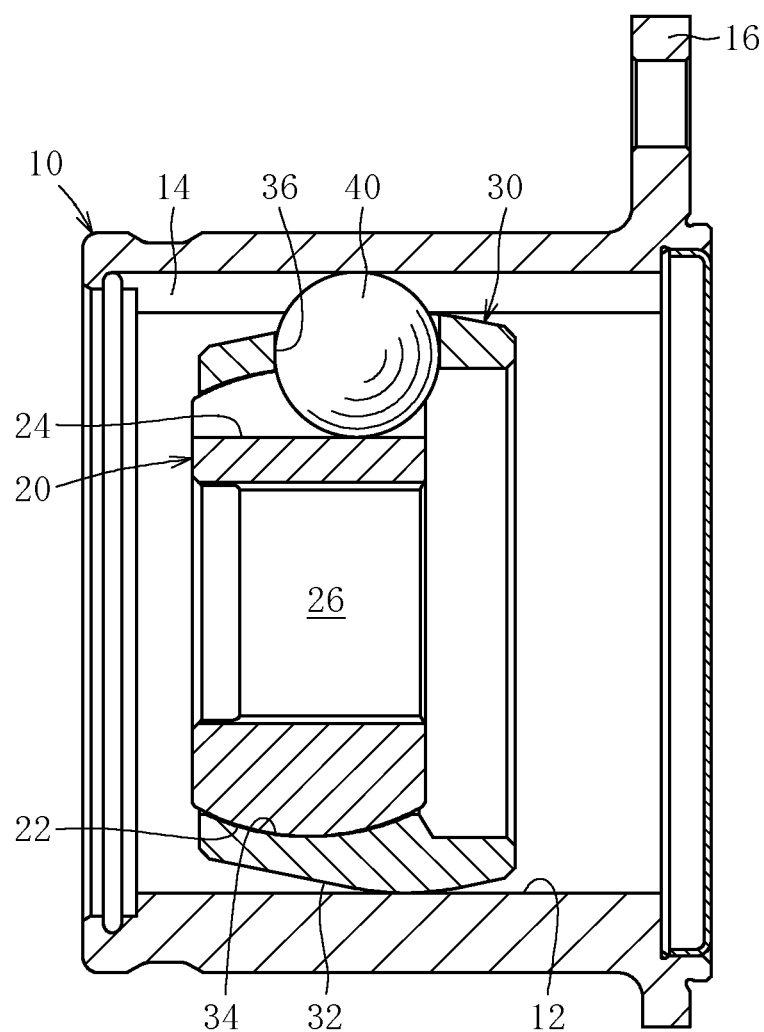
FIG. 2 is a longitudinal sectional view illustrating a double-offset constant velocity universal joint.
Figure 3A:
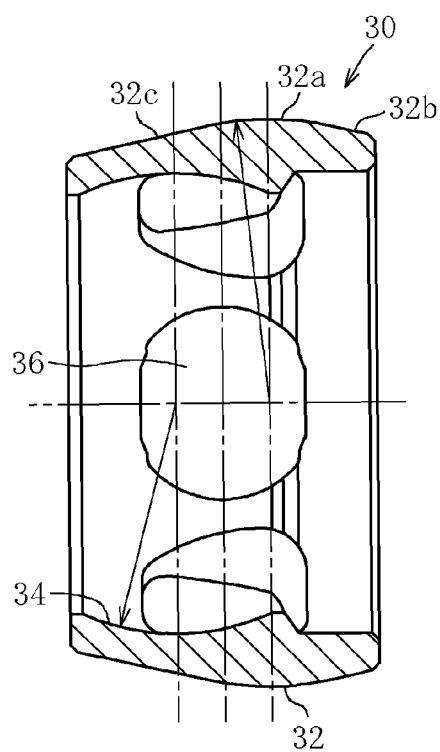
FIG. 3A is a longitudinal sectional view illustrating a cage.
Figure 3B:
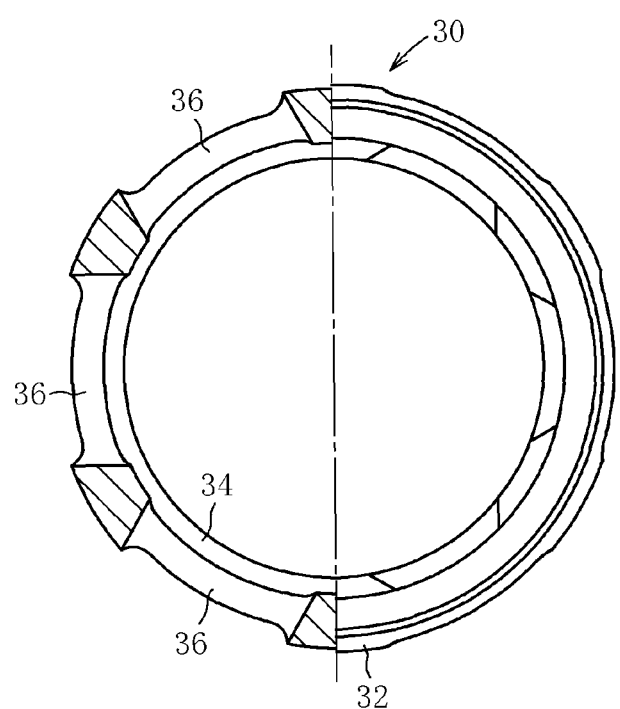
FIG. 3B is a partially sectional side view illustrating a cage.

With reference to the drawings, the present invention will now be described in accordance with an embodiment thereof. A double-offset constant velocity universal joint, illustrated by way of example in FIGS. 2, 3A, and 3B includes, as main components, an outer race 10 serving as an outer joint member; an inner race 20 serving as an inner joint member; balls 40 serving as a torque transmitting element; and a cage 30 for retaining all the balls 40 in a plane.

The outer race 10 has a flanged shape and is connected to a rotary shaft (not shown) at a flange 16. The outer race 10 has an inner cylindrical peripheral surface 12 and axially extending ball grooves 14 formed at equal intervals along the circumference of the inner peripheral surface 12.

The inner race 20 has an outer spherical peripheral surface (hereinafter referred to as the outer spherical surface) 22 and axially extending ball grooves 24 formed at equal intervals along the circumference of the outer spherical surface 22. The inner race 20 has a serrated hole 26 formed on the axial center thereof and is connected to a rotary shaft (not shown) through the serrated hole 26 so as to transmit torque therebetween.

The ball grooves 14 of the outer race 10 and the ball grooves 24 of the inner race 20 are paired with each other, so that a pair of the ball grooves (14, 24) receives one ball 40. Here, such an example is shown which employs six balls; however, for example, eight balls may also be employed in some examples.

Each ball 40 is received in a pocket 36 of the cage 30. The cage 30 is interposed between the outer race 10 and the inner race 20, serving to hold all the balls 40 in one and the same plane. The outer peripheral surface 32 of the cage 30 is made up of a spherical portion 32a and tapered portions 32b and 32c that are located on both sides thereof, respectively. The cage 30 is in contact with the inner peripheral surface 12 of the outer race 10 at the spherical portion 32a and therefore capable of angular displacement relative to the outer race 10. The tapered portions 32b and 32c serve to restrict the angle of tilt of the cage 30 relative to the outer race 10. Note that the inner peripheral surface 34 of the cage 30 is spherical and in spherical contact with the outer spherical surface 22 of the inner race 20.

The outer peripheral surface 32 and the inner spherical peripheral surface 34 of the cage 30 are cut after being quenched. A description will now be presented as to how to finish the outer peripheral surface 32 of the cage 30. As shown in FIG. 1, the entire outer peripheral surface 32, i.e., the spherical portion 32a as well as the tapered portions 32b and 32c is subjected to quenched steel cutting, thus providing the same shape as in the case of grinding. However, the spherical portion 32a is cut at such a speed as to provide the same surface roughness as in the case of grinding, whereas since the tapered portions 32b and 32c serve only for angle restriction, they are cut at as high a speed as possible more or less at the cost of surface roughness. In this manner, it is possible to ensure conventional operation angles, strength, durability, and NVH properties while shortening the total cutting time and eliminating the bottle-neck step.

Furthermore, the outer peripheral surface and the inner spherical peripheral surface of the cage can be cut after being quenched, thereby minimizing offset error and variations in thickness due to eccentricity. This makes it possible to ensure stable strength and operation angles.

The invention claimed is:
1. A double-offset constant velocity universal joint comprising:
an inner race having an outer spherical peripheral surface and ball grooves formed to extend axially at equal intervals in a circumferential direction of the outer peripheral surface;
an outer race having an inner cylindrical peripheral surface and ball grooves formed to extend axially at equal intervals in a circumferential direction of the inner peripheral surface;
a ball interposed between one of the ball grooves of the inner race and one of the ball grooves of the outer race; and
a cage interposed between the outer peripheral surface of the inner race and the inner peripheral surface of the outer race and having a pocket for accommodation of the ball,
wherein the outer peripheral surface of the cage has a spherical portion and tapered portions located on respective sides in an axial direction of the spherical portion, wherein the inner peripheral surface of the cage has a spherical portion in contact with the outer peripheral surface of the inner race, wherein the outer peripheral surface of the cage and the spherical portion of the inner peripheral surface of the cage are cut after being quenched, and wherein the entire outer peripheral surface of the cage is cut after being quenched, and the spherical portion has a cut surface roughness smaller than that of the tapered portions.

2. A double-offset constant velocity universal joint comprising:

an inner race having an outer spherical peripheral surface and ball grooves formed to extend axially at equal intervals in a circumferential direction of the outer peripheral surface;

an outer race having an inner cylindrical peripheral surface and ball grooves formed to extend axially at equal intervals in a circumferential direction of the inner peripheral surface;

a ball interposed between one of the ball grooves of the inner race and one of the ball grooves of the outer race; and a cage interposed between the outer peripheral surface of the inner race and the inner peripheral surface of the outer race and having a pocket for accommodation of the ball, wherein the outer peripheral surface of the cage has a spherical portion and tapered portions located on respective sides in an axial direction of the spherical portion, wherein the inner peripheral surface of the cage has a spherical portion in contact with the outer peripheral surface of the inner race, wherein the outer peripheral surface of the cage and the spherical portion of the inner peripheral surface of the cage are cut after being quenched, and wherein the spherical portion of the outer peripheral surface of the cage has a cut surface roughness smaller than that of the tapered portions.

3. A double-offset constant velocity universal joint comprising:

an inner race having an outer peripheral surface and ball grooves formed on the outer peripheral surface;

an outer race having an inner peripheral surface and ball grooves formed on the inner peripheral surface;

a ball interposed between one of the ball grooves of the inner race and one of the ball grooves of the outer race;

a cage interposed between the outer peripheral surface of the inner race and the inner peripheral surface of the outer race and having a pocket for accommodation of the ball, wherein the outer peripheral surface of the cage has a spherical portion and tapered portions located on respective sides in an axial direction of the spherical portion, and wherein the spherical portion has a cut surface roughness smaller than that of the tapered portions.

* * * * *